E. H. PENFIELD.
Horse Stock.
No. 12,068. Patented Dec. 12, 1854.
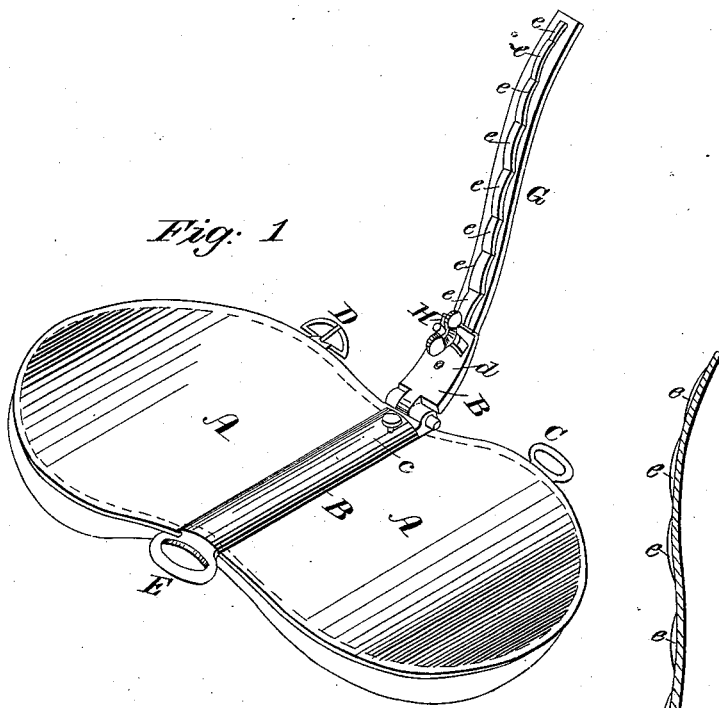

UNITED STATES PATENT OFFICE.

ELDRIDGE H. PENFIELD, OF MIDDLETOWN, CONNECTICUT.

DOCK-HOLDER FOR HORSES.

Specification of Letters Patent No. 12,068, dated December 12, 1854.

*To all whom it may concern:*

Be it known that I, ELDRIDGE H. PENFIELD, of the city of Middletown, in the county of Middlesex and State of Connecticut, have invented a new and useful Apparatus to be Used in Nicking Horses, and I do hereby declare that the following is a full, clear, and exact description of the construction, character, and operation of the same, reference being had to the accompanying drawings which make a part of this specification, in which—

Figure 1, is a perspective view of the apparatus complete. Fig. 2, is a longitudinal section of the same.

My invention consists in fitting a pad upon the rump of the horse, near the tail, which may be sustained in its proper position by a crooper, passing under the tail, to the rear end of which I attach, by a joint, a spring, and hold it in its desired position by a ratchet and ratchet wheel; and attach this spring to the horse's tail by straps passing round both, at suitable distances.

I make the pad in any convenient shape, (as like A, A, Fig. 1,) of a piece of sheet metal, indicated in section at *a, a*, Fig. 2, and pad and cover it in the usual way, as shown in Fig. 1. And I attach a bar to it, as shown at B, Figs. 1 and 2. And a loop, C, and a buckle, D, Fig. 1, (or other suitable contrivance,) to which a crooper may be attached.

At the front end of the bar, B, I have a loop, E, Figs. 1, and 2, by which it is to be attached, by means of a strap, to a surcingle, or breast girt, on the horse. And at the rear end I have a joint, F, Figs. 1, and 2. On the movable part of this joint I cut teeth like a ratchet wheel, as shown in section at F, Fig. 2. And to the stationary part I attach a spring ratchet, *b*, Fig. 2, which I work by a shaft and knob, or button, *c*, Figs. 1, and 2, in the usual way, (or in any other of the ways of using a ratchet joint). By means of this joint I elevate or depress the long spring, G, at pleasure. To the movable part of this joint, F, I attach, by a joint pin, *d*, a long curved spring, G, which is to pass over, and be attached to, the tail of the horse. And should any circumstance incline the tail to one side, (as often happens,) I make a transverse slot near the end of the movable part, where I use a thumb-screw, as seen at H, Figs. 1, and 2, by means of which slot and thumb-screw I am able to give a lateral inclination to the spring, G, at pleasure. I cover this spring, G, with leather, and to make it the more convenient for strapping it to the horse's tail, I attach a narrow strip of leather, the whole length, on the upper side, in such a manner as to form loops to receive the tail straps, as shown at *e, e*, &c., Figs. 1, and 2.

To use this apparatus, I place the pad in its proper position on the horse's rump, and adjust the crooper, and attach the front end, by a suitable strap, to the surcingle, or breast girt, to hold it firmly in its position. I then attache the long spring, G, to the upper side of the tail of the horse by a suitable number of straps passed through the loops, *e, e*, &c., and around the tail. I then elevate the tail to the desired position, where it will be firmly held by the operation of the ratchet, while the yielding of the spring, by its elasticity, will keep the tail in an easy position, much more so than when pulleys and weights are used, in the ordinary way. And when I desire to let the tail down, I press upon the button, *c*, which removes the ratchet, *b*, from the teeth, or notches, so that the tail may be readily lowered to any degree desired, at any time.

The advantages of my invention consist in its simplicity of construction; cheapness; and great convenience; as the horse may be led out to water, or for other temporary purposes, without removing it; and any inexperienced person may tend him; and in that it has no tendency to pull out, or injure the hair of the horse's tail, as is often done by the common practice, with pulleys and weights.

What I claim as my invention, and desire to secure by Letters Patent, is—

The apparatus herein set forth, when constructed, arranged, and made to operate, substantially, as herein described.

E. H. PENFIELD.

Witnesses:
FRANK TURNER,
R. FITZGERALD.